United States Patent
Gokyu et al.

(10) Patent No.: US 11,752,877 B2
(45) Date of Patent: Sep. 12, 2023

(54) CONTROL DEVICE OF VEHICLE

(71) Applicant: TOYOTA JIDOSHA KABUSHIKI KAISHA, Toyota (JP)

(72) Inventors: Keiji Gokyu, Toyota (JP); Tomoharu Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 402 days.

(21) Appl. No.: 17/216,856

(22) Filed: Mar. 30, 2021

(65) Prior Publication Data
US 2021/0362605 A1  Nov. 25, 2021

(30) Foreign Application Priority Data

May 22, 2020  (JP) ................................. 2020-089799

(51) Int. Cl.
*B60L 7/18* (2006.01)
*B60L 15/20* (2006.01)

(52) U.S. Cl.
CPC ............ *B60L 7/18* (2013.01); *B60L 15/2009* (2013.01); *B60L 2240/14* (2013.01); *B60L 2240/68* (2013.01); *B60L 2250/26* (2013.01)

(58) Field of Classification Search
None
See application file for complete search history.

(56) References Cited

U.S. PATENT DOCUMENTS

2019/0202296 A1* 7/2019 Han ..................... B60L 7/18
2020/0276972 A1* 9/2020 Ito ...................... B60W 30/146

FOREIGN PATENT DOCUMENTS

JP   2015-002583 A   1/2015

\* cited by examiner

*Primary Examiner* — Todd Melton
*Assistant Examiner* — Jason R Roberson
(74) *Attorney, Agent, or Firm* — Oliff PLC

(57) ABSTRACT

A control device includes: a deceleration control unit that performs a free running deceleration control that controls free running deceleration when transition occurs from an operation state to a non-operation state; an index deriving unit that derives a transition phase perceptual risk index; and a relationship adjusting unit that adjusts a relationship between a perceptual risk index and a deceleration. The deceleration control unit derives the deceleration corresponding to the transition phase perceptual risk index based on the relationship and sets the derived deceleration as the free running deceleration. The relationship adjusting unit executes a correction control in which when the transition phase perceptual risk index is larger than the reference perceptual risk index, the reference perceptual risk index is corrected to be increased, and when the transition phase perceptual risk index is smaller than the reference perceptual risk index, the reference perceptual risk index is corrected to be decreased.

6 Claims, 3 Drawing Sheets

CONTROL DEVICE OF VEHICLE

CROSS-REFERENCE TO RELATED APPLICATION

This application claims priority to Japanese Patent Application No. 2020-089799 filed on May 22, 2020, incorporated herein by reference in its entirety.

BACKGROUND

1. Technical Field

The present disclosure relates to a control device of a vehicle.

2. Description of Related Art

Japanese Unexamined Patent Application Publication No. 2015-2583 (JP 2015-2583 A) describes an example of a control device of a vehicle that adjusts the deceleration during a free running period from when the driver of the vehicle cancels the accelerator operation to when the brake operation is started. In this control device, a learning process is executed in which when a preceding vehicle is not detected by this control device, or when the distance between an own vehicle and the preceding vehicle is equal to or greater than a predetermined distance, the deceleration during the free running period is learned as a driver-specific deceleration. For example, in the learning process, the deceleration in the free running period is learned based on the time from when the accelerator operation is released time when the brake operation is started. Then, during the free running period, the regenerative braking force of the vehicle is adjusted such that the deceleration of the vehicle has the magnitude obtained by the learning process.

SUMMARY

In a situation in which the preceding vehicle is not detected or in a situation in which the distance between the own vehicle and the preceding vehicle is sufficiently long, it can be said that the timing of canceling the accelerator operation and the timing of starting the brake operation are not affected by the preceding vehicle. That is, in the control device described above, the learning process is executed when the driver performs vehicle operations such as the accelerator operation and the brake operation without being affected by the preceding vehicle. In contrast, when the driver performs vehicle operations such as the accelerator operation and the brake operation under a situation that may be affected by the preceding vehicle, the learning process is not executed. Thus, in a vehicle equipped with the above control device, when there is the vehicle, there is a possibility that the deceleration of the vehicle during the free running period in which both the accelerator operation and the brake operation are not performed cannot be set to a magnitude preferred by the driver.

The vehicle control device for solving the above problems includes: a deceleration control unit that performs a free running deceleration control that controls a free running deceleration that is a deceleration of a vehicle when transition occurs from an operation state in which an accelerator pedal or a brake pedal is operated to a non-operation state in which neither the accelerator pedal nor the brake pedal is operated; an index deriving unit that derives a transition phase perceptual risk index that is a perceptual risk index when transition occurs from the operation state to the non-operation state in a case in which an index of a perceptual risk when an own vehicle approaches a preceding vehicle is the perceptual risk index; and a relationship adjusting unit that adjusts a relationship between the perceptual risk index and the deceleration. In the relationship described above, when the perceptual risk index is equal to or less than a reference perceptual risk index, the deceleration is set to be equal to a lower limit deceleration, and when the perceptual risk index is larger than the reference perceptual risk index, the larger the perceptual risk index is, the larger the deceleration is set to be. The deceleration control unit derives the deceleration corresponding to the transition phase perceptual risk index based on the relationship and sets the derived deceleration as the free running deceleration. The relationship adjusting unit executes a correction control in which when the transition phase perceptual risk index is larger than the reference perceptual risk index, the reference perceptual risk index is corrected to be increased, and when the transition phase perceptual risk index is smaller than the reference perceptual risk index, the reference perceptual risk index is corrected to be decreased.

The perceptual risk is the perception of a risk that the own vehicle is approaching the preceding vehicle or the preceding vehicle is approaching the own vehicle, and the perceptual risk index is a quantification of such a perceptual risk. Here, a first type driver that makes a vehicle transition from the operation state to the non-operation state when the perceptual risk index is relatively small, and a second type driver that makes a vehicle transition from the operation state to the non-operation state after the perceptual risk index becomes relatively large will be compared. When the first type driver detects the preceding vehicle while operating the accelerator pedal, the first type driver prefers to make the vehicle transition from the operation state to the non-operation state at a relatively early stage to decelerate the vehicle. Thus, when the driver is the first type, if the deceleration of the vehicle in the non-operation state is small, there is a possibility that the brake pedal is operated by the driver in order to increase the deceleration. Therefore, it is preferable to increase the free running deceleration, which is the deceleration of the vehicle in the non-operation state.

In contrast, when the second type driver detects the preceding vehicle while operating the accelerator pedal, the second type driver prefers to delay the transition from the operated state to the non-operation state, when compared to the first type driver. Thus, when the driver is the second type, if the deceleration of the vehicle in the non-operation state is large, there is a possibility that the accelerator pedal is operated by the driver in order to decrease the deceleration. Therefore, it is preferable to reduce the free running deceleration.

Therefore, in the above configuration, when transition occurs from the operation state to the non-operation state while the vehicle is traveling, the transition phase perceptual risk index is derived and the correction control is performed based on the transition phase perceptual risk index. In the correction control, when the transition phase perceptual risk index is larger than the reference perceptual risk index, the reference perceptual risk index is corrected to be increased. In contrast, when the transition phase perceptual risk index is smaller than the reference perceptual risk index, the reference perceptual risk index is corrected to be decreased. As a result, when the driver is the second type, the reference perceptual risk index can be increased as compared to when the driver is the first type. Thus, when the driver is the second type, the target value of the free running deceleration set by the free running deceleration control can be made smaller than when the driver is the first type. As a result, the deceleration in the non-operation state is unlikely to be increased. Therefore, it is possible to suppress the operation of the accelerator pedal for decreasing the deceleration during the non-operation state from being started by the driver and suppress the non-operation state from being finished.

In contrast, when the driver is the first type, the reference perceptual risk index is not increased compared to when the driver is the second type. Thus, when the driver is the first type, the target value of the free running deceleration set by the free running deceleration control can be made larger than when the driver is the second type. As a result, the deceleration in the non-operation state tends to be increased. Therefore, it is possible to suppress the operation state of the brake pedal for increasing the deceleration during the non-operation state from being started by the driver and suppress the non-operation state from being finished.

That is, according to the above configuration, when there is the preceding vehicle in front of the own vehicle, the deceleration of the vehicle in the non-operation state can be set to a magnitude preferred by the driver. In one aspect of the control device of a vehicle, in the relationship described above, when the perceptual risk index is equal to or larger than a predetermined perceptual risk index that is larger than the reference perceptual risk index, the deceleration is set to be equal to an upper limit deceleration, and when the perceptual risk index is larger than the reference perceptual risk index and smaller than the predetermined perceptual risk index, the larger the perceptual risk index is, the larger the deceleration is set to be. In this case, in the correction control, when the transition phase perceptual risk index is larger than the reference perceptual risk index, the relationship adjusting unit corrects the predetermined perceptual risk index to be increased, and when the transition phase perceptual risk index is smaller than the reference perceptual risk index, the relationship adjusting unit corrects the predetermined perceptual risk index to be decreased.

A case in which the predetermined perceptual risk index is not corrected by the correction control will be considered. In this case, assuming that the transition phase perceptual risk index is a value close to the predetermined perceptual risk index, there is not much difference in the target value of the free running deceleration that is derived based on the above-described relationship in the free running deceleration control, when the driver is the first type and when the driver is the second type.

In this regard, according to the above configuration, in the correction control, not only the reference perceptual risk index but also the predetermined perceptual risk index is corrected. Thus, compared to the case in which the predetermined perceptual risk index is not corrected, even if the transition phase perceptual risk index is large, the difference in the target value of the free running deceleration derived in the free running deceleration control when the driver is the first type and when the driver is the second type can be made large. As a result, it is possible to largely differentiate the deceleration of the vehicle in the non-operation state, when the driver is the first type and when the driver is the second type.

In one aspect of the control device of a vehicle, in the correction control, when the transition phase perceptual risk index is larger than the reference perceptual risk index, the larger a difference between the transition phase perceptual risk index and the reference perceptual risk index is, the larger an increasing correction amount of the reference perceptual risk index and an increasing correction amount of the predetermined perceptual risk index are set to be by the relationship adjusting unit. Further, when the transition phase perceptual risk index is smaller than the reference perceptual risk index, the larger the difference between the transition phase perceptual risk index and the reference perceptual risk index is, the larger the decreasing correction amount of the reference perceptual risk index and the decreasing correction amount of the predetermined perceptual risk index are set to be by the relationship adjusting unit.

According to the above configuration, the correction amount of the reference perceptual risk index and the correction amount of the predetermined perceptual risk index can be changed in accordance with the difference between the transition phase perceptual risk index and the reference perceptual risk index. Thus, in the free running deceleration control, the target value of the free running deceleration can be brought closer to the driver's preference.

When the transition phase perceptual risk index is relatively small, it is possible to easily increase the difference between the target value of the free running deceleration derived in the case of the first type driver and the target value of the free running deceleration derived in the case of the second type driver when the correction amount of the reference perceptual risk index is larger, compared to when the correction amount of the reference perceptual risk index is smaller.

it is preferable that, in the correction control, when the transition phase perceptual risk index is larger than the reference perceptual risk index, the relationship adjusting unit set the increasing correction amount of the reference perceptual risk index to be larger than the increasing correction amount of the predetermined perceptual risk index, and when the transition phase perceptual risk index is smaller than the reference perceptual risk index, the relationship adjusting unit set the decreasing correction amount of the reference perceptual risk index to be larger than the decreasing correction amount of the predetermined perceptual risk index. Thus, the correction amount of the reference perceptual risk index can be increased by the correction control. As a result, even when the transition phase perceptual risk index is relatively small, the magnitude of the deceleration of the vehicle in the non-operation state is easily reflected on the driver type.

For example, the perceptual risk index can be derived based on a vehicle following distance between the own vehicle and the preceding vehicle, an approaching speed of the own vehicle toward the preceding vehicle, and a vehicle speed of the own vehicle. In this case, the index deriving unit derives the transition phase perceptual risk index based on the vehicle following distance, the approaching speed, and the vehicle speed of the own vehicle when transition occurs from the operation state to the non-operation state. In this way, a value that reflects the length of the vehicle following distance, the degree of the approaching speed of the own vehicle to the preceding vehicle, and the degree of the vehicle speed of the own vehicle, when transition occurs from the operated state to the non-operation state, can be derives as the transition phase perceptual risk index.

By the way, when the deceleration of the vehicle in the non-operation state is larger than the deceleration preferred by the driver, the driver may operate the accelerator pedal to reduce the deceleration of the vehicle. When the vehicle is an electric vehicle having a generator that applies a regenerative braking force corresponding to a power generation amount to the vehicle, power generated by the generator in the non-operation state ends up being consumed by the power source of the vehicle.

Thus, when the vehicle to which the above-mentioned control device of a vehicle is applied is an electric vehicle, the larger a target value of the free running deceleration control unit is, the larger the power generation amount of the generator is preferably set by the deceleration control unit. According to this configuration, since the deceleration of the vehicle in the non-operation state can be set to a magnitude corresponding to the type of the driver, it is possible to suppress the accelerator pedal from being operated by the driver for the purpose of decreasing the deceleration of the vehicle, after transition occurs from the operation state to the non-operation state. Therefore, it is possible to suppress the energy efficiency of the vehicle from being decreased.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
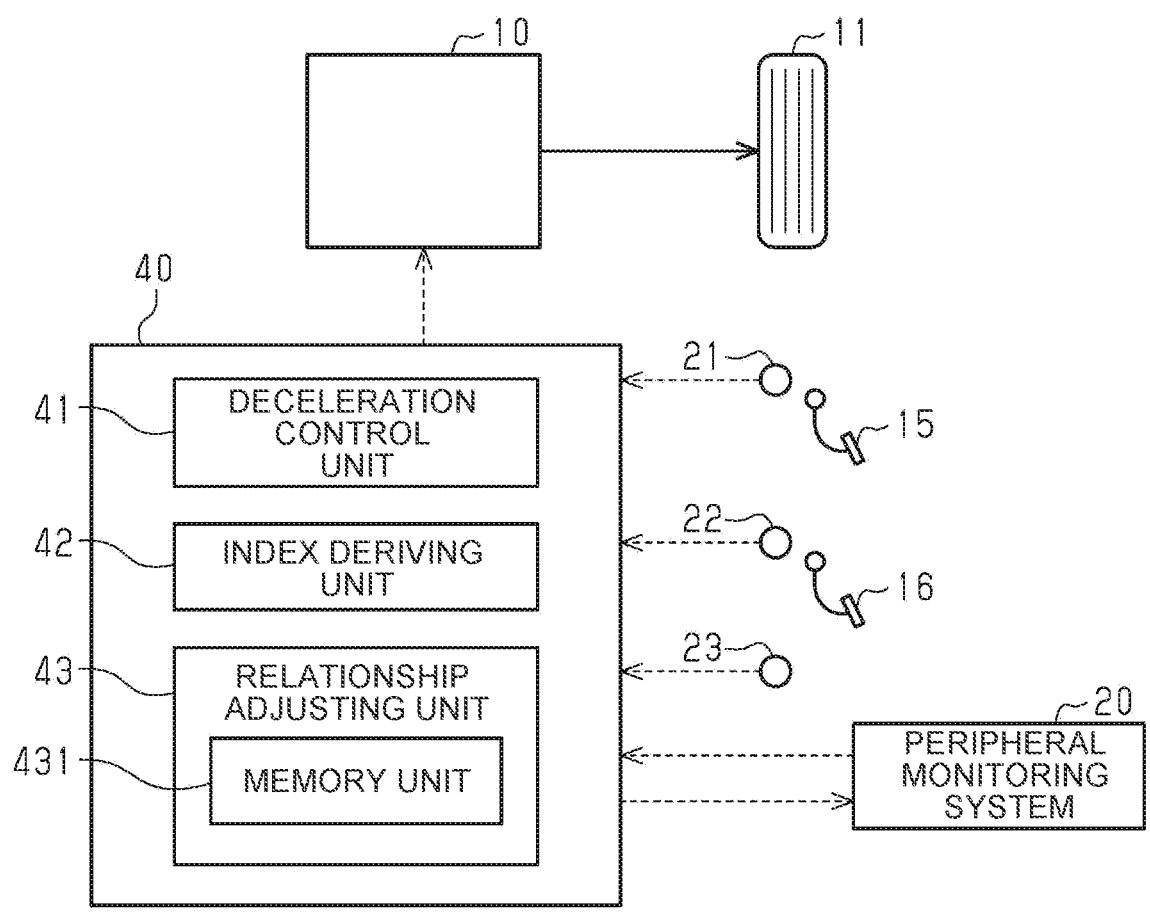
FIG. 1 is a diagram showing a relationship between a functional configuration of a control device of a vehicle of an embodiment and the vehicle to which the control device is applied.

Hereinafter, an embodiment of the control device of a vehicle will be described with reference to FIGS. 1 to 5. FIG. 1 shows a vehicle to which a control device 40 of the present embodiment is applied. The vehicle is an electric vehicle including a motor generator 10 controlled by the control device 40. When the vehicle is accelerated, a driving force of the motor generator 10 is input to drive wheels 11. In contrast, when the vehicle is decelerated, the rotation of the drive wheels 11 is transmitted to the motor generator 10, such that the motor generator 10 generates electricity. At this time, the larger a power generation amount of the motor generator 10 is, the larger a regenerative braking force of the vehicle is. That is, the motor generator 10 functions as a "generator" that applies a regenerative braking force, which corresponds to the power generation amount, to the vehicle.

The vehicle is provided with a peripheral monitoring system 20 that monitors the periphery of an own vehicle. The peripheral monitoring system 20 includes an imaging means such as a camera, a radar, and the like. Then, the peripheral monitoring system 20 detects the presence or absence of a preceding vehicle. Further, when there is the preceding vehicle, the peripheral monitoring system 20 detects the vehicle following distance D between the own vehicle and the preceding vehicle and a relative speed Vr of the own vehicle based on the preceding vehicle. Then, the peripheral monitoring system 20 transmits the information obtained by the peripheral monitoring system 20, that is, the presence/absence of the preceding vehicle, the vehicle following distance D, and the relative speed Vr to the control device 40.

The relative speed Vr is "0" when the vehicle following distance D is held at a constant value. When the own vehicle is gradually approaching the preceding vehicle and the vehicle following distance D is short, the relative speed Vr is a positive value. When the own vehicle is gradually moving away from the preceding vehicle and the vehicle following distance D is long, the relative speed Vr is a negative value. That is, the relative speed Vr is the approaching speed of the own vehicle to the preceding vehicle.

Detection signals are input to the control device 40 from various sensors. Examples of a sensor include an accelerator operation amount sensor 21, a brake stroke sensor 22, and a vehicle speed sensor 23. The accelerator operation amount sensor 21 detects an accelerator operation amount AC, which is the operation amount of an accelerator pedal 15 by the driver of the vehicle, and outputs a signal corresponding to the detection result as a detection signal. In contrast, the brake stroke sensor 22 detects a brake operation amount BP, which is an operation amount of the brake pedal 16 by the driver, and outputs a signal corresponding to the detection result as a detection signal. The vehicle speed sensor 23 detects a vehicle speed Vs, which is the moving speed of the own vehicle, and outputs a signal corresponding to the detection result as a detection signal.

The control device 40 may have any of the following configurations (a) to (c).

(a) The control device 40 includes one or more processors that execute various processes according to a computer program. The processor includes a CPU and a memory such as a RAM and a ROM. The memory stores a program code or a command configured to cause the CPU to execute the process. A memory, that is, a computer-readable medium, includes any available medium accessible by a general purpose or dedicated computer.

(b) The control device 40 includes one or more dedicated hardware circuits that execute various processes. Dedicated hardware circuits include, for example, application-specific integrated circuits such as an ASIC or an FPGA. ASIC is an abbreviation for "Application Specific Integrated Circuit", and FPGA is an abbreviation for "Field Programmable Gate Array".

(c) The control device 40 includes a processor that executes a part of various processes according to a computer program, and a dedicated hardware circuit that executes the remaining processes of the various processes.

The control device 40 has a deceleration control unit 41, an index deriving unit 42, and a relationship adjusting unit 43 serving as functional units.

When the deceleration of the vehicle in the non-operation state is set to "free running deceleration Dec", the deceleration control unit 41 performs a free running deceleration control in which the free running deceleration Dec is controlled through the motor generator 10, in the non-operation state. That is, in the free running deceleration control, the deceleration control unit 41 controls the free running deceleration Dec by adjusting the regenerative braking force generated by the power generation of the motor generator 10. The non-operation state is a state in which neither the accelerator pedal 15 nor the brake pedal 16 is operated. The state in which the accelerator pedal 15 or the brake pedal 16 is operated is also referred to as an "operation state".

When the preceding vehicle is detected by the peripheral monitoring system 20, the index deriving unit 42 derives the transition phase perceptual risk index KPs, which is a perceptual risk index KP when transition occurs from the operation state to the non-operation state. The perceptual risk index KP is a quantification of the perceptual risk, which is the perception that the own vehicle is approaching the preceding vehicle and the perception that the preceding vehicle approaches the own vehicle. The stronger the perceptual risk is, the larger the perceptual risk index KP is.

In the present embodiment, the perceptual risk index KP is derived based on the vehicle following distance D, the relative speed Vr, and the vehicle speed Vs of the own vehicle. For example, the perceptual risk index KP can be derived using the following relational expression (Equation 1). The index deriving unit 42 derives the transition phase perceptual risk index KPs by substituting the vehicle following distance D, the relative speed Vr, and the vehicle speed Vs into the relational expression (Equation 1) when transition occurs from the operation state to the non-operation state. A coefficient "α" in the relational expression (Equation 1) is determined from the specifications of the vehicle.

$$KP = \frac{Vr + \alpha \cdot Vs}{D} \qquad \text{Equation 1}$$

According to the above relational expression (Equation 1), the shorter the vehicle following distance D is, the larger the value is derived as the perceptual risk index KP. The higher the relative speed Vr is, the larger the value is derived as the perceptual risk index KP. The higher the vehicle speed Vs of the own vehicle is, the larger the value is derived as the perceptual risk index KP.

The relationship adjusting unit 43 adjusts the relationship between the perceptual risk index KP and the deceleration of the own vehicle. That is, a base deceleration map Map1 and a correction map Map2 are stored in a memory unit 431 of the relationship adjusting unit 43. The base deceleration map Map1 is a map showing the relationship between the vehicle speed Vs of the own vehicle and a deceleration Gx of the own vehicle. That is, by using the base deceleration map Map1, a base deceleration DecB used when setting a target value DecTr for free running deceleration can be derived. The correction map Map2 is a map showing the relationship between the perceptual risk index KP and a correction coefficient H. In the present embodiment, the product of the base deceleration DecB and the correction coefficient H is set as the target value DecTr for the free running deceleration.

The relationship adjusting unit 43 performs correction control for correcting the correction map Map2 based on the transition phase perceptual risk index KPs when transition occurs from the operation state to the non-operation state. The specific content of the correction control will be described later.

Figure 2:
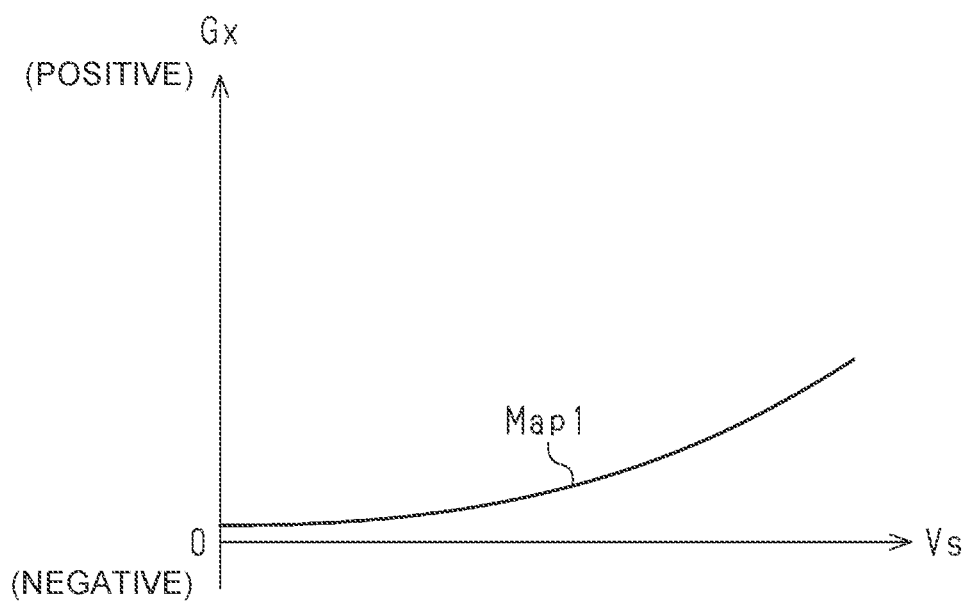
FIG. 2 is a map showing a relationship between a vehicle speed and a deceleration of an own vehicle.

The base deceleration map Map1 will be described with reference to FIG. 2.

The base deceleration map Map1 is a map that changes the base deceleration DecB according to the vehicle speed Vs of the own vehicle. The deceleration Gx referred to here is a negative acceleration. A large deceleration Gx means that the decrease amount in vehicle speed per unit time is large. That is, when the deceleration Gx is a positive value, the vehicle is decelerating, and when the deceleration Gx is a negative value, the vehicle is accelerating. In accordance with the base deceleration map Map1, the base deceleration DecB is derived such that the higher the vehicle speed Vs is, the larger the base deceleration DecB is.

Figure 3:
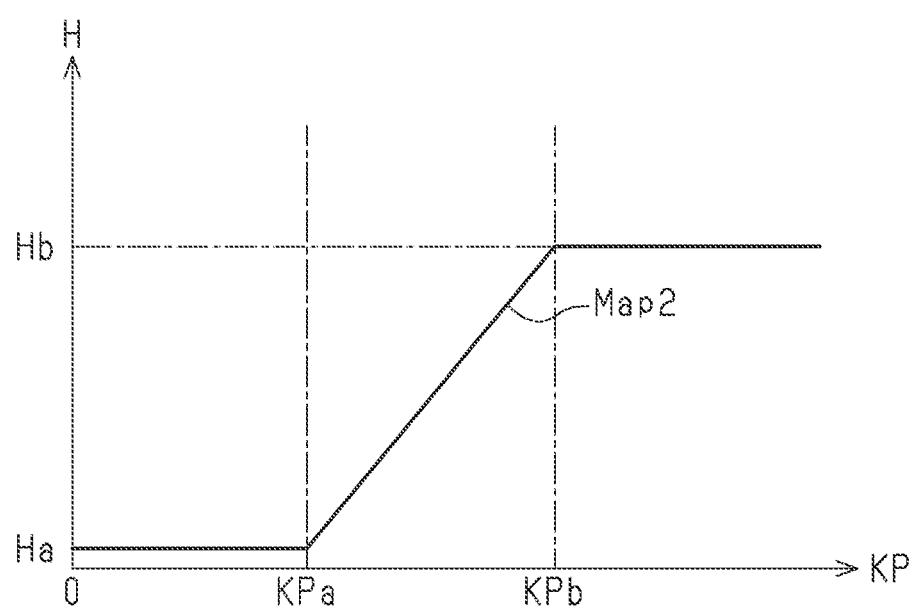
FIG. 3 is a map showing a relationship between a perceptual risk index and a correction coefficient.

The correction map Map2 will be described with reference to FIG. 3. The correction map Map2 is a map that changes the correction coefficient H based on the perceptual risk index KP. That is, when the perceptual risk index KP is equal to or smaller than a first perceptual risk index KPa, a lower limit value Ha is derived as the correction coefficient H. When the perceptual risk index KP is equal to or greater than a second perceptual risk index KPb, which is larger than the first perceptual risk index KPa, an upper limit value Hb larger than the lower limit value Ha is derived as the correction coefficient H. When the perceptual risk index KP is larger than the first perceptual risk index KPa and smaller than the second perceptual risk index KPb, the larger the second perceptual risk index KPb is, the larger a value derived as the correction coefficient H is.

In the present embodiment, the first perceptual risk index KPa is a "reference perceptual risk index", and the second perceptual risk index KPb is a "predetermined perceptual risk index". Further, the product of the base deceleration DecB and the lower limit value Ha according to the vehicle speed Vs when transition occurs from the operation state to the non-operation state corresponds to a "lower limit deceleration", and the product of the base deceleration DecB and the upper limit value Hb corresponds to an "upper limit deceleration".

Figure 4:
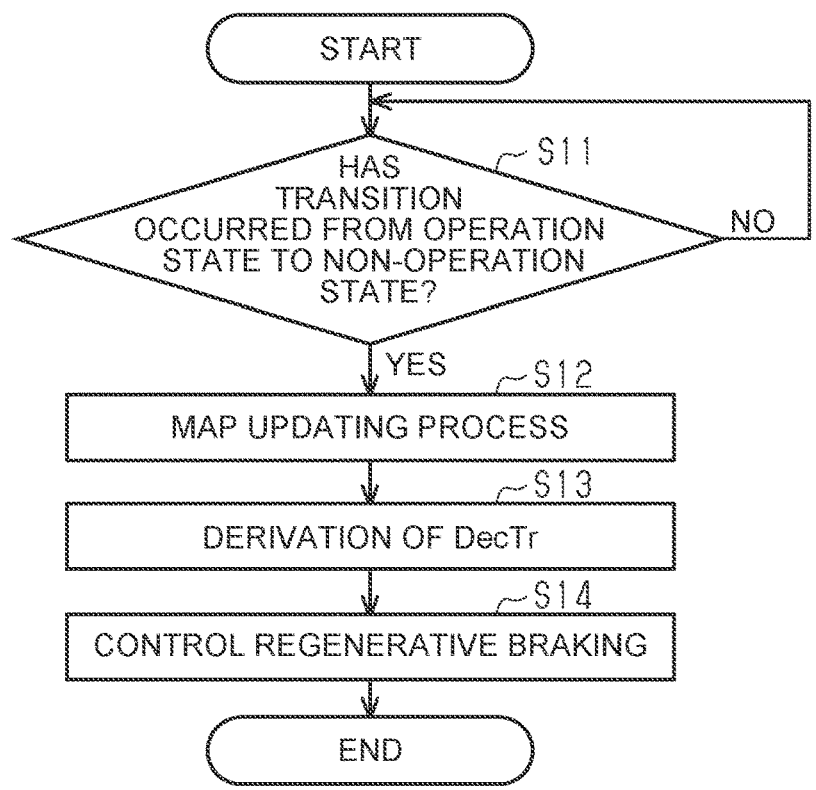
FIG. 4 is a flowchart showing a flow of a series of processes executed by the control device.

Next, with reference to FIG. 4, the flow of a series of processes executed by the control device 40 when deriving the target value DecTr for free running deceleration will be described. This series of processing is started when a vehicle is in the operation state.

In step S11, the control device 40 determines whether the transition from the operation state to the non-operation state has occurred. For example, the control device 40 determines that the transition has occurred from the operation state to the non-operation state when both the following are established: the accelerator operation amount AC is equal to or less than a cancellation determination operation amount ACTh; and the brake operation amount BP is equal to or less than a cancellation determination operation amount BPTh. In contrast, the control device 40 does not determine that the transition has occurred from the operation state to the non-operation state when at least one of the following is established: the accelerator operation amount AC is equal to or less than the cancellation determination operation amount ACTh; and the brake operation amount BP is equal to or less than the cancellation determination operation amount BPTh.

When it is not determined that the operation state has transitioned to the non-operation state (S11: NO), the control device 40 repeats the determination in step S11 until it is determined that the operation state has transitioned to the non-operation state. In contrast, when it is determined that the operation state has transitioned to the non-operation state (S11: YES), the control device 40 moves the process to the next step S12.

In step S12, the control device 40 executes the map update process. That is, the index deriving unit 42 of the control device 40 derives the transition phase perceptual risk index KPs. In the present embodiment, the index deriving unit 42 derives the transition phase perceptual risk index KPs by substituting the vehicle following distance D, the relative speed Vr, and the vehicle speed Vs of the own vehicle into the relational expression (Equation 1) when transition occurs from the operation state to the non-operation state.

Subsequently, the relationship adjusting unit 43 of the control device 40 adjusts the relationship between the perceptual risk index KP and the deceleration based on the transition phase perceptual risk index KPs derived by the index deriving unit 42. That is, when the transition phase perceptual risk index KPs is larger than the first perceptual risk index KPa, the relationship adjusting unit 43 performs the correction control in which both the first perceptual risk index KPa and the second perceptual risk index KPb are corrected to be increased, and when the transition phase perceptual risk index KPs is smaller than the first perceptual risk index KPa, the relationship adjusting unit 43 performs the correction control in which both the first perceptual risk index KPa and the second perceptual risk index KPb are corrected to be decreased. Correcting the first perceptual risk index KPa and the second perceptual risk index KPb means correcting the correction map Map2. In the present embodiment, when the transition phase perceptual risk index KPs is equal to the first perceptual risk index KPa, the correction map Map2 is not corrected.

The correction method of the correction map Map2 will be described in detail.

In the correction control, the relationship adjusting unit 43 corrects the first perceptual risk index KPa and the second perceptual risk index KPb in accordance with the difference between the transition phase perceptual risk index KPs and the first perceptual risk index KPa. That is, when the value obtained by subtracting the first perceptual risk index KPa from the transition phase perceptual risk index KPs is defined as an "index difference $\Delta KP$", the relationship adjusting unit 43 uses the index difference $\Delta KP$ to derive a correction amount $\Delta KPa$ of the first perceptual risk index KPa and a correction amount $\Delta KPb$ of the second perceptual risk index KPb. For example, the relationship adjusting unit 43 derives the correction amount $\Delta KPa$ of the first perceptual risk index by using the following relational expression (Equation 2), and derives the correction amount $\Delta KPb$ of the second perceptual risk index by using the following relational expression (Equation 3). In the relational expressions (Equation 2) and (Equation 3), values larger than "0" and less than "1" are set as "X" and "Y", respectively.

$$\Delta KPa = \Delta KP \cdot X \quad \text{Equation 2}$$

$$\Delta KPb = \Delta KP \cdot Y \quad \text{Equation 3}$$

When the transition phase perceptual risk index KPs is larger than the first perceptual risk index KPa, the index difference $\Delta KP$ becomes a positive value. Thus, positive values are derived as the correction amounts $\Delta KPa$ and $\Delta KPb$. That is, the correction amount $\Delta KPa$ derived when the transition phase perceptual risk index KPs is larger than the first perceptual risk index KPa corresponds to an "increasing correction amount of the first perceptual risk index KPa", and the correction amount $\Delta KPb$ derived when the transition phase perceptual risk index KPs is larger than the first perceptual risk index KPa corresponds to an "increasing correction amount of the second perceptual risk index KPb". In contrast, when the transition phase perceptual risk index KPs is smaller than the first perceptual risk index KPa, the index difference $\Delta KP$ becomes a negative value. Thus, negative values are derived as the correction amounts $\Delta KPa$ and $\Delta KPb$. That is, the correction amount $\Delta KPa$ derived when the transition phase perceptual risk index KPs is smaller than the first perceptual risk index KPa corresponds to a "decreasing correction amount of the first perceptual risk index KPa", and the correction amount $\Delta KPb$ derived when the transition phase perceptual risk index KPs is smaller than the first perceptual risk index KPa corresponds to a "decreasing correction amount of the second perceptual risk index KPb".

Then, the relationship adjusting unit 43 derives the sum of the first perceptual risk index KPa before correction and the correction amount $\Delta KPa$ as the first perceptual risk index KPa after correction. The relationship adjusting unit 43 derives the sum of the second perceptual risk index KPb before correction and the correction amount $\Delta KPb$ as the second perceptual risk index KPb after correction. In the present embodiment, a value larger than the coefficient Y is set as the coefficient X. Therefore, the absolute value of the correction amount $\Delta KPa$ of the first perceptual risk index is larger than the absolute value of the correction amount $\Delta KPb$ of the second perceptual risk index.

When the correction of the correction map Map2 is completed in this way, the control device 40 ends the map update process and executes the free running deceleration control during. That is, in the step S13 in the beginning, the deceleration control unit 41 of the control device 40 derives the target value DecTr for free running deceleration. That is, by using the base deceleration map Map1, the deceleration control unit 41 derives the base deceleration DecB corresponding to the vehicle speed Vs of the own vehicle when transition occurs from the operation state to the non-operation state. Further, by using the corrected correction map Map2, the deceleration control unit 41 derives the correction coefficient H corresponding to the transition phase perceptual risk index KPs derived in step S12. Then, the deceleration control unit 41 derives the product of the base deceleration DecB and the correction coefficient H as the target value DecTr for free running deceleration.

Subsequently, the larger the target value DecTr for free running deceleration is, the larger the value set by the deceleration control unit 41 as a target value of the regenerative braking force of the vehicle is. When the target value of the regenerative braking force is set as the regenerative target value, the deceleration control unit 41 controls the power generation amount of the motor generator 10 such that the actual regenerative braking force of the vehicle becomes the regenerative target value. That is, the deceleration control unit 41 controls the regenerative braking force of the vehicle. Then, the control device 40 ends the series of processes.

Figure 5:
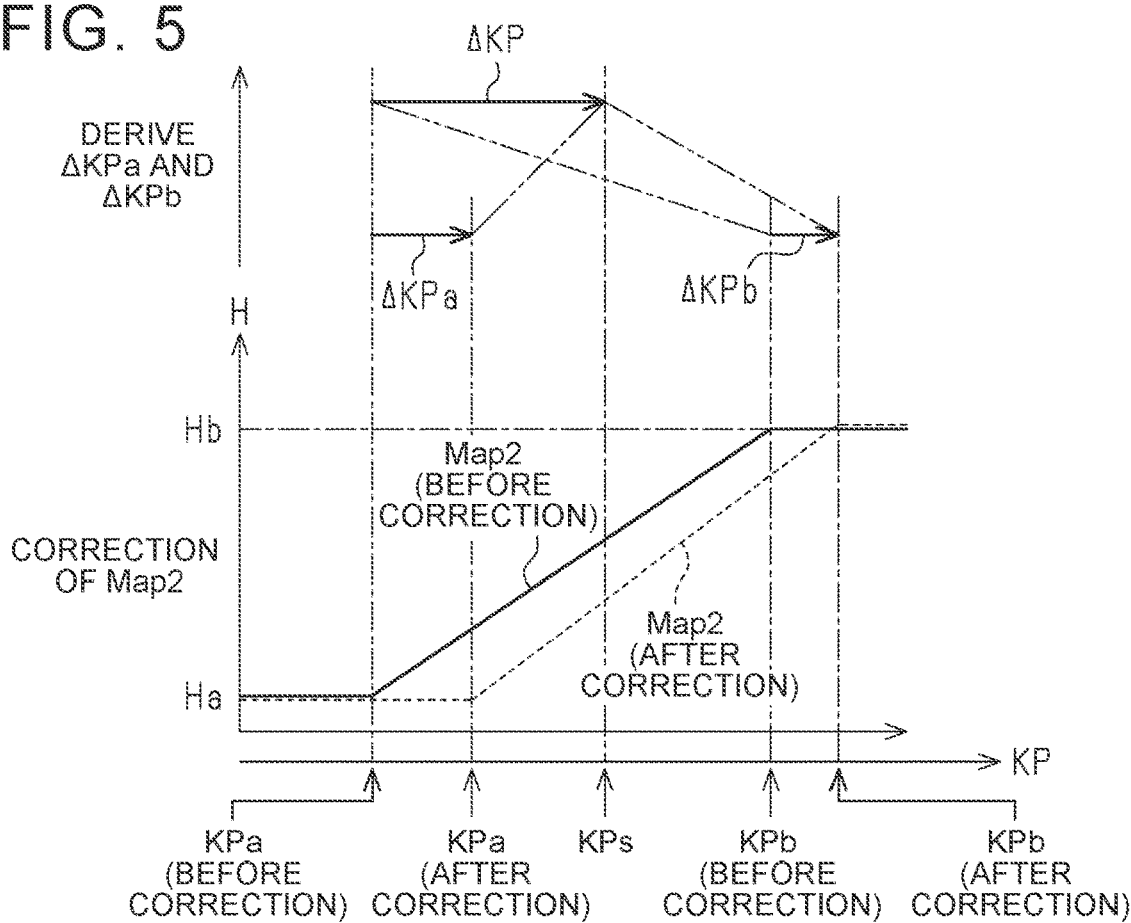
FIG. 5 is a diagram showing how a correction map is corrected when transition occurs from an operation state to a non-operation state.

The operations and effects of the present embodiment will be described with reference to FIG. 5. In a situation in which there is the preceding vehicle in front of the own vehicle, transition occurs from the operation state to the non-operation state by operation of the driver. The transition phase perceptual risk index KPs is derived using the above relational expression (Equation 1). As shown in FIG. 5, the correction map Map2 is corrected, for example.

In the example shown in FIG. 5, since the transition phase perceptual risk index KPs is larger than the first perceptual risk index KPa, the first perceptual risk index KPa and the second perceptual risk index KPb are each corrected to be increased. That is, the correction map Map2 is corrected. In FIG. 5, the correction map Map2 before correction is shown by a solid line, and the correction map Map2 after correction is shown by a broken line.

In contrast, when the transition phase perceptual risk index KPs is smaller than the first perceptual risk index KPa, the first perceptual risk index KPa and the second perceptual risk index KPb are each corrected to be decreased. When the correction map Map2 is corrected as described above, a value corresponding to the transition phase perceptual risk index KPs is derived as the correction coefficient H based on the corrected correction map Map2. Further, the base deceleration DecB corresponding to the vehicle speed Vs of the own vehicle at the time of transition is derived using the base deceleration map Map1. Then, the product of the base deceleration DecB and the correction coefficient H is derived as the target value DecTr for free running deceleration. Then, the motor generator 10 is controlled based on this target value DecTr.

Here, a first type driver that makes a vehicle transition from the operation state to the non-operation state when the perceptual risk index KP is relatively small, and a second type driver that makes a vehicle transition from the operation state to the non-operation state after the perceptual risk index KP becomes relatively large will be compared. When the first type driver detects the preceding vehicle while operating the accelerator pedal 15, the first type driver prefers to make the vehicle transition from the operation state to the non-operation state at a relatively early stage to decelerate the vehicle. Thus, when the driver is the first type, if the deceleration of the vehicle in the non-operation state is small, there is a possibility that the brake pedal 16 is operated by the driver in order to increase the deceleration.

In contrast, when the second type driver detects the preceding vehicle while operating the accelerator pedal 15, the second type driver prefers to delay the transition from the operated state to the non-operation state, when compared to the first type driver. Thus, when the driver is the second type, if the deceleration of the vehicle in the non-operation state is large, there is a possibility that the accelerator pedal 15 is operated by the driver in order to decrease the deceleration.

In this regard, in the present embodiment, the target value DecTr for free running deceleration is derived using the correction map Map2 corrected as described above. Thus, when the driver is the second type, the first perceptual risk index KPa is increased by the correction control as compared to when the driver is the first type. Therefore, even if the transition phase perceptual risk index KPs is large, a large value is hardly derived as the target value DecTr for free running deceleration, compared to when the driver is the first type. As a result, it is possible to suppress the operation of the accelerator pedal 15 from being started by the driver so as to decrease the deceleration of the vehicle, to the degree in which the deceleration of the vehicle in the non-operation state can be suppressed from becoming large.

In contrast, when the driver is the first type, the first perceptual risk index KPa does become large as compared to when the driver is the second type. Thus, in the free running deceleration control, the target value DecTr for the free running deceleration can be made larger than when the driver is the second type. As a result, the deceleration in the non-operation state can be increased. Therefore, it is possible to suppress the operation of the brake pedal 16 from being stated by the driver in order to increase the deceleration when the vehicle is in the non-operation state.

Thus, in the present embodiment, when there is the preceding vehicle, the deceleration of the vehicle in the non-operation state can be set to a size preferred by the driver. Therefore, it is possible to suppress the driver from unnecessarily operating the accelerator pedal 15 and the brake pedal 16 when transition occurs from the operation state to the non-operation state.

According to the present embodiment, the following effects can be further obtained.

(1) In the present embodiment, not only the first perceptual risk index KPa but also the second perceptual risk index KPb is corrected by the correction control. Thus, compared to when the second perceptual risk index KPb is not corrected, even if the transition phase perceptual risk index KPs is large, it is possible to increase the difference of the target value DecTr of the free running deceleration derived in the free running deceleration control in the case of the first type driver and the second type driver. As a result, it is possible to largely differentiate the deceleration of the vehicle in the non-operation state, when the driver is the first type and when the driver is the second type.

(2) In the correction control performed in the present embodiment, as shown in the upper graph in FIG. 5, the correction amount ΔKPa of the first perceptual risk index can be changed in accordance with the index difference ΔKP. Thus, in the free running deceleration control, the target value DecTr for the free running deceleration can be brought closer to the driver's preference.

(3) In the present embodiment, a value larger than the coefficient Y is set as the coefficient X. Thus, as shown in the upper graph in FIG. 5, in the correction control, the absolute value of the correction amount ΔKPa of the first perceptual risk index can be made larger than the absolute value of the correction amount ΔKPb of the second perceptual risk index. By greatly correcting the first perceptual risk index KPa with the correction control in this way, even when the transition phase perceptual risk index KPs is small, the magnitude of the deceleration of the vehicle in the non-operation state can be made to be easily reflected by the driver's type.

(4) When the deceleration of the vehicle in the non-operation state is larger than the deceleration preferred by the driver, the driver may operate the accelerator pedal 15 to reduce the deceleration of the vehicle. In this case, the electric power generated by the generator in the non-operation state is consumed by the power source of the vehicle.

In this respect, in the present embodiment, the deceleration of the vehicle in the non-operation state can be set to a size corresponding to the type of the driver. Thus, it is possible to suppress the accelerator pedal 15 from being operated by the driver with the purpose of decreasing the deceleration of the vehicle, when transition occurs from the operation state to the non-operation state. That is, it is possible to suppress the electric power obtained by the generation of the regenerative braking force in the non-operation state from being consumed by the driving of the motor generator 10 following the operation of the accelerator pedal 15. Therefore, it is possible to suppress the energy efficiency of the vehicle from being decreased.

The present embodiment can be modified and implemented as follows. The present embodiment and the following modifications can be combined unless technical inconsistency arises.

In the correction control, the correction map Map2 may be corrected as follows. For example, each time transition occurs from the operation state to the non-operation state, the transition phase perceptual risk index KPs is derived. When a specified number of the transition phase perceptual risk index KPs can be obtained, the average value of each transition phase perceptual risk index KPs may be derived, and the first perceptual risk index KPa and the second perceptual risk index KPb may be derived based on this average value. In this case, the value in which the first perceptual risk index KPa is subtracted from the average value is substituted into the above-described relational expressions (Equation 2) and (Equation 3) as the index difference ΔKP to derive the correction amount ΔKPa of the first perceptual risk index and the correction amount ΔKPb of the second perceptual risk index.

The perceptual risk index KP may be derived by a method different from the method using the above relational expression (Equation 1). For example, THW may be adopted as the perceptual risk index KP, or TTC may be derived as the perceptual risk index KP. THW is an abbreviation for "Time Headway" and TTC is an abbreviation for "Time to Collision". THW is a value obtained by dividing the vehicle following distance D by the vehicle speed Vs of the own vehicle, and TTC is a value obtained by dividing the vehicle following distance D by the relative speed Vr.

It is not necessary to set a value larger than the coefficient Y as the coefficient X. For example, the coefficient X may be set to the same value as the coefficient Y. In this case, the correction amount ΔKPa of the first perceptual risk index and the correction amount ΔKPb of the second perceptual risk index are equal to each other. Further, a value smaller than the coefficient Y may be set as the coefficient X. In this case, the absolute value of the correction amount ΔKPa of the first perceptual risk index becomes smaller than the absolute value of the correction amount ΔKPb of the second perceptual risk index.

The correction control may be a control for correcting the first perceptual risk index KPa with a method different from the method described in the above embodiment as long as the first perceptual risk index KPa can be corrected. For example, when the transition phase perceptual risk index KPs is larger than the first perceptual risk index KPa, the sum of the first perceptual risk index KPa before correction and a first specified value may be set as the first perceptual risk index KPa after correction. When the transition phase perceptual risk index KPs is smaller than the first perceptual risk index KPa, the value obtained by subtracting a second specified value from the first perceptual risk index KPa before correction may be referred to as the first perceptual risk index KPa after correction. In this case, positive values are each set as the first specified value and the second specified value. The first specified value may be a value equal to the second specified value or a value different from the second specified value.

The correction control may be a control for correcting the second perceptual risk index KPb with a method different from the method described in the above embodiment as long as the second perceptual risk index KPb can be corrected. For example, when the transition phase perceptual risk index KPs is larger than the first perceptual risk index KPa, the sum of the second perceptual risk index KPb before correction and a third specified value may be set as the second perceptual risk index KPb after correction. When the transition phase perceptual risk index KPs is smaller than the first perceptual risk index KPa, the value obtained by subtracting a fourth specified value from the second perceptual risk index KPb before correction may be referred to as the second perceptual risk index KPb after correction. In this case, positive values are each set as the third specified value and the fourth specified value. The third specified value may be a value equal to the fourth specified value or a value different from the fourth specified value.

When correcting the correction map Map2, when the first perceptual risk index KPa is corrected, the second perceptual risk index KPb does not have to be corrected. The base deceleration DecB may be fixed at a predetermined value regardless of the vehicle speed Vs when transition occurs from the operation state to the non-operation state.

The vehicle to which the control device 40 is applied may be a hybrid vehicle having both an engine and a motor as a power source of the vehicle. In the above embodiment, the free running deceleration Dec, which is the deceleration of the vehicle in the non-operation state, is controlled by adjusting the amount of power generated by the motor generator 10. However, the control of the free running deceleration Dec is not limited to this as long as the free running deceleration Dec can be adjusted. For example, when decelerating the vehicle in the non-operation state, the free running deceleration Dec may be controlled by adjusting a friction braking force generated by operating the brakes provided for each wheel. In this case, the vehicle to which the control device 40 is applied does not have to be an electric vehicle. That is, the control device 40 can be applied to a vehicle equipped with only an engine as a power source of the vehicle.

Further, the control device 40 may be applied to a vehicle provided with an exhaust brake. In this case, when decelerating the vehicle in the non-operation state, the free running deceleration Dec may be controlled by adjusting a braking force generated by the operation of the exhaust brake.

What is claimed is:

1. A control device of a vehicle, the control device comprising:
   a deceleration control unit that performs a free running deceleration control that controls a free running deceleration that is a deceleration of a vehicle when transition occurs from an operation state in which an accelerator pedal or a brake pedal is operated to a non-operation state in which neither the accelerator pedal nor the brake pedal is operated;
   an index deriving unit that derives a transition phase perceptual risk index that is a perceptual risk index when transition occurs from the operation state to the non-operation state in a case in which an index of a perceptual risk when an own vehicle approaches a preceding vehicle is the perceptual risk index; and
   a relationship adjusting unit that adjusts a relationship between the perceptual risk index and the deceleration,
   wherein in the relationship, when the perceptual risk index is equal to or less than a reference perceptual risk index, the deceleration is set to be equal to a lower limit deceleration, and when the perceptual risk index is larger than the reference perceptual risk index, the larger the perceptual risk index is, the larger the deceleration is set to be,
   wherein in the free running deceleration control, the deceleration control unit derives the deceleration corresponding to the transition phase perceptual risk index based on the relationship and sets the derived deceleration as the free running deceleration, and
   wherein the relationship adjusting unit executes a correction control in which when the transition phase perceptual risk index is larger than the reference perceptual risk index, the reference perceptual risk index is corrected to be increased, and when the transition phase perceptual risk index is smaller than the reference perceptual risk index, the reference perceptual risk index is corrected to be decreased.

2. The control device of a vehicle according to claim 1, wherein:
   in the relationship, when the perceptual risk index is equal to or larger than a predetermined perceptual risk index that is larger than the reference perceptual risk index, the deceleration is set to be equal to an upper limit deceleration, and when the perceptual risk index is larger than the reference perceptual risk index and smaller than the predetermined perceptual risk index, the larger the perceptual risk index is, the larger the deceleration is set to be; and in the correction control, when the transition phase perceptual risk index is larger than the reference perceptual risk index, the relationship adjusting unit corrects the predetermined perceptual risk index to be increased, and when the transition phase perceptual risk index is smaller than the reference perceptual risk index, the relationship adjusting unit corrects the predetermined perceptual risk index to be decreased.

3. The control device of a vehicle according to claim 2, wherein in the correction control, when the transition phase perceptual risk index is larger than the reference perceptual risk index, the larger a difference between the transition phase perceptual risk index and the reference perceptual risk index is, the larger an increasing correction amount of the reference perceptual risk index and an increasing correction amount of the predetermined perceptual risk index are set to be by the relationship adjusting unit, and when the transition phase perceptual risk index is smaller than the reference perceptual risk index, the larger the difference between the transition phase perceptual risk index and the reference perceptual risk index is, the larger a decreasing correction amount of the reference perceptual risk index and a decreasing correction amount of the predetermined perceptual risk index are set to be by the relationship adjusting unit.

4. The control device of a vehicle according to claim 3, wherein in the correction control, when the transition phase perceptual risk index is larger than the reference perceptual risk index, the relationship adjusting unit sets the increasing correction amount of the reference perceptual risk index to be larger than the increasing correction amount of the predetermined perceptual risk index, and when the transition phase perceptual risk index is smaller than the reference perceptual risk index, the relationship adjusting unit sets the decreasing correction amount of the reference perceptual risk index to be larger than the decreasing correction amount of the predetermined perceptual risk index.

5. The control device of a vehicle according to claim 1, wherein:
   the perceptual risk index is derived based on a vehicle following distance between the own vehicle and the preceding vehicle, an approaching speed of the own vehicle toward the preceding vehicle, and a vehicle speed of the own vehicle; and
   the index deriving unit derives the transition phase perceptual risk index based on the vehicle following distance, the approaching speed, and the vehicle speed of the own vehicle, when transition occurs from the operation state to the non-operation state.

6. The control device of a vehicle according to claim 1, wherein:
   the vehicle is an electric vehicle that has a generator that applies regenerative braking force corresponding to a power generation amount to the vehicle; and
   in the free running deceleration control, the larger a target value of the free running deceleration control is, the larger the power generation amount of the generator is set to be by the deceleration control unit.

\* \* \* \* \*